US012682815B1

(12) United States Patent
Zeng

(10) Patent No.: US 12,682,815 B1
(45) Date of Patent: Jul. 14, 2026

(54) DISPLAY DEVICE AND DRIVING METHOD THEREOF

(71) Applicant: WUHAN CHINA STAR OPTOELECTRONICS TECHNOLOGY CO., LTD., Wuhan (CN)

(72) Inventor: Mian Zeng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 19/315,579

(22) Filed: Aug. 31, 2025

(30) Foreign Application Priority Data

Jul. 3, 2025 (CN) ......................... 202510919130.3

(51) Int. Cl.
*G09G 3/20* (2006.01)
*G09G 3/32* (2016.01)

(52) U.S. Cl.
CPC ............. *G09G 3/2074* (2013.01); *G09G 3/32* (2013.01); *G09G 2310/0267* (2013.01); *G09G 2310/027* (2013.01); *G09G 2320/0247* (2013.01); *G09G 2340/0435* (2013.01); *G09G 2360/18* (2013.01)

(58) Field of Classification Search
CPC ................... G09G 3/2074; G09G 3/32; G09G 2310/0267; G09G 2310/027; G09G 2320/0247; G09G 2340/0435; G09G 2360/18
See application file for complete search history.

(56) References Cited

U.S. PATENT DOCUMENTS

| | | | | |
|---|---|---|---|---|
| 7,508,398 | B1 * | 3/2009 | Montrym | G06T 1/60 345/568 |
| 9,711,112 | B2 * | 7/2017 | Ooga | G09G 5/10 |
| 10,008,176 | B2 * | 6/2018 | Kim | G09G 3/2092 |
| 10,152,923 | B2 * | 12/2018 | Li | G09G 3/3233 |
| 11,908,381 | B2 * | 2/2024 | Goetz | G09G 3/2096 |
| 12,307,994 | B1 * | 5/2025 | Huang | G09G 3/3607 |

(Continued)

FOREIGN PATENT DOCUMENTS

| | | | | |
|---|---|---|---|---|
| CN | 107845358 A * | 3/2018 | | G09G 3/2092 |
| CN | 120690138 A * | 9/2025 | | G09G 3/2074 |
| WO | WO-2012053404 A1 * | 4/2012 | | G09G 3/20 |

*Primary Examiner* — William Lu
(74) *Attorney, Agent, or Firm* — PV IP PC; Wei Te Chung

(57) ABSTRACT

A display device and a driving method thereof are provided. Each of a plurality of sub-pixel groups in the display device includes a plurality of rows of sub-pixels. A frame buffer is configured to sequentially buffer data signals (including a plurality of sub-data signals corresponding to a plurality of sub-frames) of sub-pixel groups from the first sub-pixel group to the last sub-pixel group (each of the sub-pixel groups includes at least one row of sub-pixels) within one frame. When the frame buffer has completed buffering the data signals of a certain sub-pixel group within a current frame, a source driver is configured to control the sub-pixel group and a preceding sub-pixel group of the sub-pixel group to display an image of a corresponding sub-frame of the current frame, and control a subsequent sub-pixel group of the sub-pixel group to display an image of a corresponding sub-frame of a previous frame.

20 Claims, 6 Drawing Sheets

(56) References Cited

U.S. PATENT DOCUMENTS

| | | | | |
|---|---|---|---|---|
| 12,525,172 | B2 * | 1/2026 | Jang | G09G 3/32 |
| 2007/0013618 | A1 * | 1/2007 | Jung | G09G 3/2022 345/67 |
| 2007/0019743 | A1 * | 1/2007 | Dambrackas | H04N 19/182 375/240.26 |
| 2008/0018571 | A1 * | 1/2008 | Feng | G09G 3/3648 345/87 |
| 2011/0007098 | A1 * | 1/2011 | Park | G09G 3/3611 345/88 |
| 2011/0018887 | A1 * | 1/2011 | Uchiyama | G09G 5/006 345/545 |
| 2011/0043552 | A1 * | 2/2011 | Brown Elliott | G09G 3/3406 345/694 |
| 2011/0063333 | A1 * | 3/2011 | Chiou | G09G 3/2092 345/212 |
| 2013/0027363 | A1 * | 1/2013 | He | G09G 3/3677 345/204 |
| 2013/0271441 | A1 * | 10/2013 | Ahn | G02F 1/13306 345/87 |
| 2014/0347402 | A1 * | 11/2014 | Kaplan | G09G 3/3258 345/690 |
| 2016/0307492 | A1 * | 10/2016 | Kim | G09G 3/2044 |
| 2016/0379538 | A1 * | 12/2016 | Yan | G09G 3/20 345/698 |
| 2018/0075822 | A1 * | 3/2018 | Ng | G09G 5/393 |
| 2018/0203273 | A1 * | 7/2018 | Zeng | G09G 3/3611 |
| 2018/0240399 | A1 * | 8/2018 | Lin | G09G 3/32 |
| 2019/0073970 | A1 * | 3/2019 | Liu | G09G 3/3614 |
| 2020/0219437 | A1 * | 7/2020 | Lin | G09G 3/3233 |
| 2022/0122557 | A1 * | 4/2022 | Kim | G09G 3/3688 |
| 2023/0178001 | A1 * | 6/2023 | Sin | G09G 5/006 345/204 |
| 2024/0021128 | A1 * | 1/2024 | Lee | G09G 3/20 |
| 2024/0404455 | A1 * | 12/2024 | Kwon | G09G 3/32 |

* cited by examiner

FIG. 5
G1
F1 F2 F3 F4 F5 F6 F7 F8 F9 F10 F11 F12 F13 F14 F15 F16 F17 F18 F19
B7-2 B6-4 B1 B0 B7-6 B5-1 B6-1 B7-4 B7-8 B6-3 B7-1 B2 B7-3 B3 B4 B7-4 B5-2 B7-7 B6-2
G2
F2 F3 F4 F5 F6 F7 F8 F9 F10 F11 F12 F13 F14 F15 F16 F17 F18 F19 F1
B6-4 B1 B0 B7-6 B5-1 B6-1 B7-4 B7-8 B6-3 B7-1 B2 B7-3 B3 B4 B7-4 B5-2 B7-7 B6-2 B7-2
G3
F3 F4 F5 F6 F7 F8 F9 F10 F11 F12 F13 F14 F15 F16 F17 F18 F19 F1 F2
B1 B0 B7-6 B5-1 B6-1 B7-4 B7-8 B6-3 B7-1 B2 B7-3 B3 B4 B7-4 B5-2 B7-7 B6-2 B7-2 B6-4
G4
F4 F5 F6 F7 F8 F9 F10 F11 F12 F13 F14 F15 F16 F17 F18 F19 F1 F2 F3
B0 B7-6 B5-1 B6-1 B7-4 B7-8 B6-3 B7-1 B2 B7-3 B3 B4 B7-4 B5-2 B7-7 B6-2 B7-2 B6-4 B1
F5 F6 F7 F8 F9 F10 F11 F12 F13 F14 F15 F16 F17 F18 F19 F1 F2 F3 F4
B7-6 B5-1 B6-1 B7-4 B7-8 B6-3 B7-1 B2 B7-3 B3 B4 B7-4 B5-2 B7-7 B6-2 B7-2 B6-4 B1 B0
G6
F6 F7 F8 F9 F10 F11 F12 F13 F14 F15 F16 F17 F18 F19 F1 F2 F3 F4 F5
B5-1 B6-1 B7-4 B7-8 B6-3 B7-1 B2 B7-3 B3 B4 B7-4 B5-2 B7-7 B6-2 B7-2 B6-4 B1 B0 B7-6

DISPLAY DEVICE AND DRIVING METHOD THEREOF

CROSS-REFERENCE TO RELATED APPLICATIONS

The present application claims priority to and the benefit of Chinese Patent Application No. 202510919130.3, filed on Jul. 3, 2025, the disclosures of which is incorporated herein by reference in its entirety.

TECHNICAL FIELD

The present application relates to the field of display technology, and specifically relates to a display device and a driving method thereof.

BACKGROUND

Micro LED (Micro Light Emitting Diode) display panels are currently commonly driven for display using a digital sub-field scanning approach, that is, a frame can be divided into a plurality of sub-frames with different weight coefficients, where different weight coefficients indicate that sub-pixels correspond to different light-emitting durations; the sub-pixel emits light or does not emit light correspondingly according to a value condition of each sub-frame, and the brightness of the gray scale corresponding to the frame is presented by combining superposition of light-emitting durations of a plurality of sub-frames.

However, in the current digital sub-field scanning approach, it is required that all bit data of all sub-pixels within a frame are written into a frame buffer before images of a plurality of sub-frames are displayed in sequence, which causes a delay greater than a frame of data transmission duration between display of a frame of image and data input of the frame of image, resulting in a large time difference between an action of a user and a system response in application scenarios such as virtual reality, and reducing user experience.

SUMMARY

The objective of the present application is to provide a display device and a driving method thereof, so as to solve the technical problem of poor user experience of existing Micro LED display panels in application scenarios such as virtual reality.

Embodiments of the present application provide a display device, including:

- a plurality of sub-pixels, divided into a plurality of sub-pixel groups, where each of the sub-pixel groups includes at least one row of the sub-pixels, and the plurality of sub-pixel groups includes sub-pixel groups from a first sub-pixel group to an $n^{th}$ sub-pixel group, where n is a positive integer greater than 1;
- a plurality of gate lines, divided into gate line groups from a first gate line group to an $n^{th}$ gate line group corresponding to the sub-pixel groups from the first sub-pixel group to the $n^{th}$ sub-pixel group, where each of the gate lines in the $i^{th}$ gate line group is electrically connected to corresponding ones of the sub-pixels in the $i^{th}$ sub-pixel group, where i is a positive integer greater than or equal to 1 and less than or equal to n;
- a frame buffer, configured to sequentially buffer data signals of each of the sub-pixels from the first sub-pixel group to the $n^{th}$ sub-pixel group within one frame, where one frame includes sub-frames from a first sub-frame to an $m^{th}$ sub-frame, where m is a positive integer greater than 1, and the data signals includes m sub-data signals of the corresponding sub-pixels respectively presented in sub-frames from the first sub-frame to the $m^{th}$ sub-frame; and
- a source driver, electrically connected between the frame buffer and the plurality of sub-pixels, configured to:
  - control each of the sub-pixels in the first sub-pixel group to display an image of the first sub-frame within a current frame, and control each of the sub-pixels in the second sub-pixel group to display an image of a previous frame, when n is equal to 2 and the frame buffer has completed buffering the data signals of each of the sub-pixels in the first sub-pixel group within the current frame; or
  - control each of the sub-pixels in the first sub-pixel group to display the image of the first sub-frame within the current frame, and control each of the sub-pixels in the second sub-pixel group and the third sub-pixel group to display the image of the previous frame, when n is equal to 3 and the frame buffer has completed buffering the data signals of each of the sub-pixels in the first sub-pixel group within the current frame; and, control each of the sub-pixels in the first sub-pixel group and the second sub-pixel group to display an image of the second sub-frame within the current frame, and control each of the sub-pixels in the third sub-pixel group to display the image of the previous frame, when n is equal to 3 and the frame buffer has completed buffering the data signals of each of the sub-pixels in the second sub-pixel group within the current frame; or
  - control each of the sub-pixels in the first sub-pixel group to display the image of the first sub-frame within the current frame, and control each of the sub-pixels in the sub-pixel groups from the second sub-pixel group to the $n^{th}$ sub-pixel group to display the image of the previous frame, when n is greater than 3 and the frame buffer has completed buffering the data signals of each of the sub-pixels in the first sub-pixel group within the current frame; and, control each of the sub-pixels in sub-pixel groups from the first sub-pixel group to the $j^{th}$ sub-pixel group to display an image of the $j^{th}$ sub-frame within the current frame, and control each of the sub-pixels in the sub-pixel groups from the $(j+1)^{th}$ sub-pixel group to the $n^{th}$ sub-pixel group to display the image of the previous frame, when n is greater than 3 and the frame buffer has completed buffering the data signals of each of the sub-pixels in the $j^{th}$ sub-pixel group within the current frame, where j is greater than 1 and less than n; and, control each of the sub-pixels in the sub-pixel groups from the first sub-pixel group to the $n^{th}$ sub-pixel group to display an image of the $n^{th}$ sub-frame within the current frame, when n is greater than 3 and the frame buffer has completed buffering the data signals of each of the sub-pixels in the $n^{th}$ sub-pixel group within the current frame, where j is a positive integer greater than 1 and less than n.

Embodiments of the present application further provide a driving method of a display device, used for driving the display device as described in any of the above, including:

- controlling the frame buffer to sequentially buffer data signals of each of the sub-pixels from the first sub-pixel group to the $n^{th}$ sub-pixel group within one frame, where one frame includes sub-frames from a first sub-frame to an $m^{th}$ sub-frame, m is a positive integer greater than 1, and the data signals includes m sub-data signals of the corresponding sub-pixels respectively presented in sub-frames from the first sub-frame to the $m^{th}$ sub-frame;

judging whether n is equal to 2;

controlling, through the source driver, each of the sub-pixels in the first sub-pixel group to display an image of the first sub-frame within a current frame, and controlling each of the sub-pixels in the second sub-pixel group to display an image of a previous frame, when n is equal to 2 and the frame buffer has completed buffering the data signals of each of the sub-pixels in the first sub-pixel group within a current frame;

judging whether n is equal to 3 when n is not equal to 2;

controlling, through the source driver, each of the sub-pixels in the first sub-pixel group to display the image of the first sub-frame within the current frame, and controlling each of the sub-pixels in the second sub-pixel group and the third sub-pixel group to display the image of the previous frame, when n is equal to 3 and the frame buffer has completed buffering the data signals of each of the sub-pixels in the first sub-pixel group within the current frame; and, controlling, through the source driver, each of the sub-pixels in the first sub-pixel group and the second sub-pixel group to display an image of the second sub-frame within the current frame, and controlling each of the sub-pixels in the third sub-pixel group to display the image of the previous frame, when n is equal to 3 and the frame buffer has completed buffering the data signals of each of the sub-pixels in the second sub-pixel group within the current frame;

judging whether n is greater than 3 when n is not equal to 3; and controlling, through the source driver, each of the sub-pixels in the first sub-pixel group to display the image of the first sub-frame within the current frame, and controlling each of the sub-pixels in sub-pixel groups from the second sub-pixel group to the $n^{th}$ sub-pixel group to display the image of the previous frame, when n is greater than 3 and the frame buffer has completed buffering the data signals of each of the sub-pixels in the first sub-pixel group within the current frame; and, controlling, through the source driver, each of the sub-pixels in sub-pixel groups from the first sub-pixel group to the $j^{th}$ sub-pixel group to display an image of the $j^{th}$ sub-frame within the current frame, and controlling each of the sub-pixels in sub-pixel groups from the $(j+1)^{th}$ sub-pixel group to the $n^{th}$ sub-pixel group to display the image of the previous frame, when n is greater than 3 and the frame buffer has completed buffering the data signals of each of the sub-pixels in the $j^{th}$ sub-pixel group within the current frame, where j is greater than 1 and less than n; and, controlling, through the source driver, each of the sub-pixels in sub-pixel groups from the first sub-pixel group to the $n^{th}$ sub-pixel group to display an image of the $n^{th}$ sub-frame within the current frame, when n is greater than 3 and the frame buffer has completed buffering the data signals of each of the sub-pixels in the $n^{th}$ sub-pixel group within the current frame, where j is a positive integer greater than 1 and less than n.

Embodiments of the present application provide a display device and a driving method thereof. Each of a plurality of sub-pixel groups in the display device includes a plurality of rows of sub-pixels. The frame buffer is configured to sequentially buffer data signals (including a plurality of sub-data signals corresponding to a plurality of sub-frames) of sub-pixel groups from the first sub-pixel group to the last sub-pixel group within one frame. When the frame buffer has completed buffering the data signals of a certain sub-pixel group within a current frame, the source driver is configured to control the sub-pixel group and a preceding sub-pixel group of the sub-pixel group to display the image of a corresponding sub-frame of the current frame, and control a subsequent sub-pixel group of the sub-pixel group to display an image of a corresponding sub-frame of the previous frame. The complete image of the current frame is displayed earliest when the data signals of the last sub-pixel group in the current frame are acquired, thereby shortening the interval between the display of a frame image and the input of data signals of corresponding ones of the rows of sub-pixels, and reducing the time difference between an action of a user and a system response.

DETAILED DESCRIPTION

The following clearly and completely describes the technical solutions in embodiments of the present application with reference to the accompanying drawings in embodiments of the present application. Obviously, the described embodiments are only a part of embodiments of the present application, rather than all the embodiments. Based on embodiments in the present application, all other embodiments obtained by those skilled in the art without making creative labor shall fall within the protection scope of the present application.

In the description of the present application, terms such as “first” and “second” are only used for descriptive purposes, and shall not be understood as indicating or implying relative importance or implicitly indicating the number of indicated technical features. Thus, a feature defined with “first” or “second” may explicitly or implicitly include one or more of the features. In addition, it should be noted that the accompanying drawings only provide structures closely related to the present application, and some details less related to the application are omitted. The purpose is to simplify the accompanying drawings, make the inventive points clear, rather than indicating that the device in practice is exactly the same as the accompanying drawings, and it shall not be taken as a limitation on the device in practice.

Reference to “embodiment” herein means that a specific feature, structure or characteristic described in combination with the embodiment may be included in at least one embodiment of the present application. The appearance of the phrase at various time points in the specification does not necessarily refer to the same embodiment, nor is it an independent or alternative embodiment mutually exclusive with other embodiments. It is explicitly and implicitly understood by those skilled in the art that embodiments described herein may be combined with other embodiments.

Embodiments of the present application provide a display device, including but is not limited to the following embodiments and combinations of the following embodiments.

Figure 1:
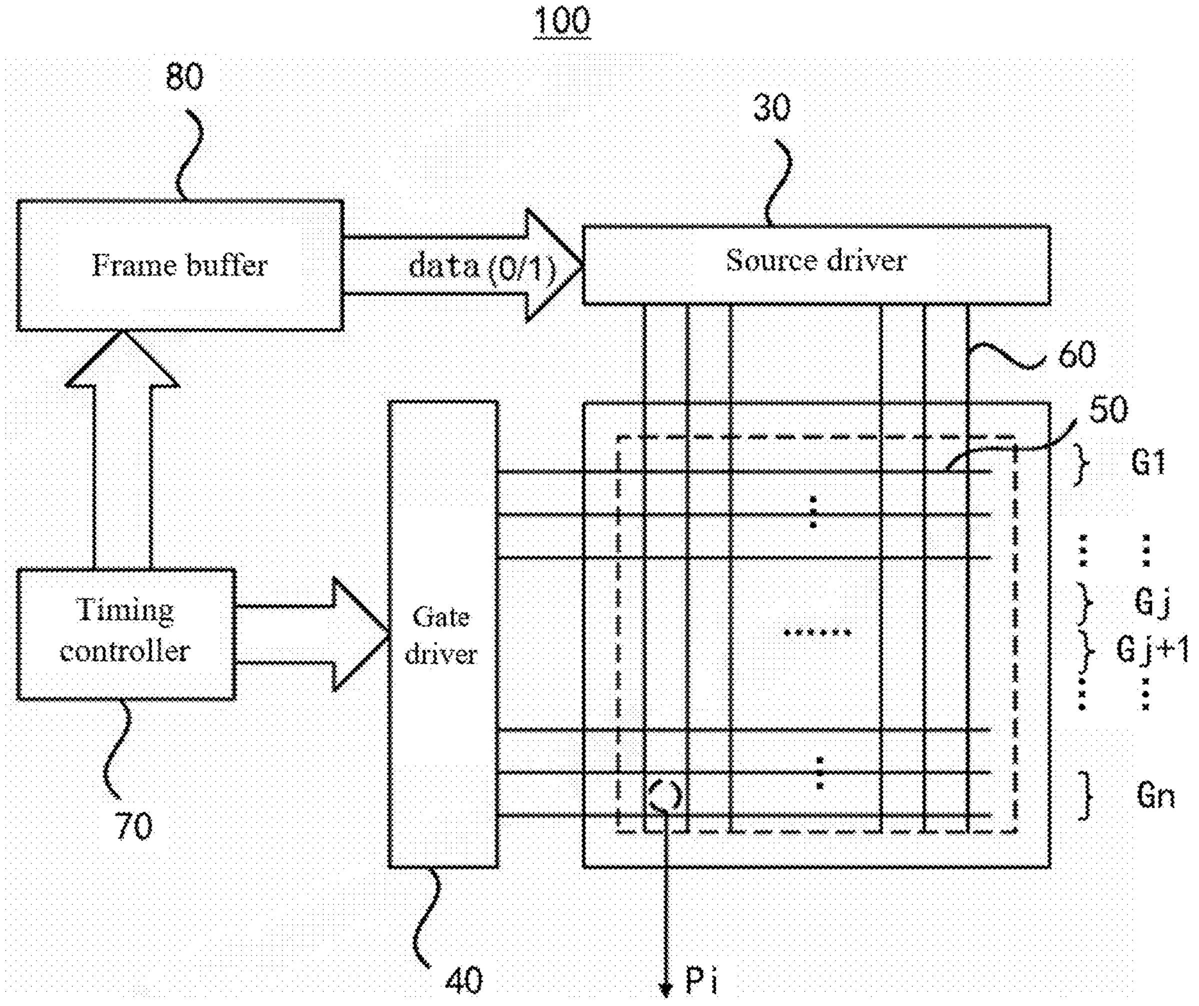
FIG. 1 is a schematic diagram of the architecture of a display device provided by embodiments of the present application.

In an embodiment, as shown in FIG. 1, the display device 100 includes: a plurality of sub-pixels Pi divided into a plurality of sub-pixel groups, where the plurality of sub-pixel groups including sub-pixel groups from a first sub-pixel group G1 to an $n^{th}$ sub-pixel group Gn, and n is a positive integer greater than 1; a plurality of gate lines 50, divided into gate line groups from a first gate line group to an $n^{th}$ gate line group corresponding to sub-pixel groups from the first sub-pixel group to the $n^{th}$ sub-pixel group, each of the gate lines 50 in the $i^{th}$ gate line group is electrically connected to corresponding ones of the sub-pixels Pi in the $i^{th}$ sub-pixel group, where i is a positive integer greater than or equal to 1 and less than or equal to n; a frame buffer 80, configured to sequentially buffer data signals Data of each of the sub-pixels Pi from the first sub-pixel group to the $n^{th}$ sub-pixel group within one frame, where one frame includes sub-frames from a first sub-frame to an $m^{th}$ sub-frame, m is a positive integer greater than 1, and the data signals Data includes m sub-data signals (Data 1 to Data m) of the corresponding sub-pixels respectively presented in sub-frames from the first sub-frame to the $m^{th}$ sub-frame; and, a source driver 30, electrically connected between the frame buffer 80 and the plurality of sub-pixels.

For convenience of description, as shown in FIG. 1, the description is made by taking a plurality of sub-pixels Pi arranged along the row direction and column direction as an example, that is, each sub-pixel group includes at least one row of sub-pixels Pi. The display device 100 may further include a gate driver 40 and a plurality of data lines 60, each gate line 50 is electrically connected between a corresponding output terminal of the gate driver 40 and a corresponding row of sub-pixels Pi, so as to transmit a corresponding gate signal to the row of sub-pixels Pi, and each data line 60 is electrically connected between the source driver 30 and a corresponding column of sub-pixels Pi to transmit a corresponding data signal Data to the corresponding column of sub-pixels Pi.

Further, the display device 100 may further include a timing controller 70. The timing controller 70 may obtain control signals and a plurality of image signals corresponding to a plurality of frames from the front end, the timing controller 70 may generate clock signals acting on the gate driver 40 according to the control signals, the gate driver 40 may generate the plurality of gate signals according to the clock signals, the frame buffer 80 may obtain image signals of each frame, each image signal may include a plurality of gray scale signals corresponding to a plurality of sub-pixels Pi, the gray scale signals may represent gray scale values of the sub-pixels Pi, and the frame buffer 80 is further configured to generate the corresponding data signals Data according to the gray scale signals. The source driver 30 is configured to output data signals Data corresponding to the row of sub-pixels Pi when a certain row of sub-pixels Pi is turned on, so that each of the plurality of sub-pixels Pi in the row emits light according to the corresponding data signals Data.

Figure 2:
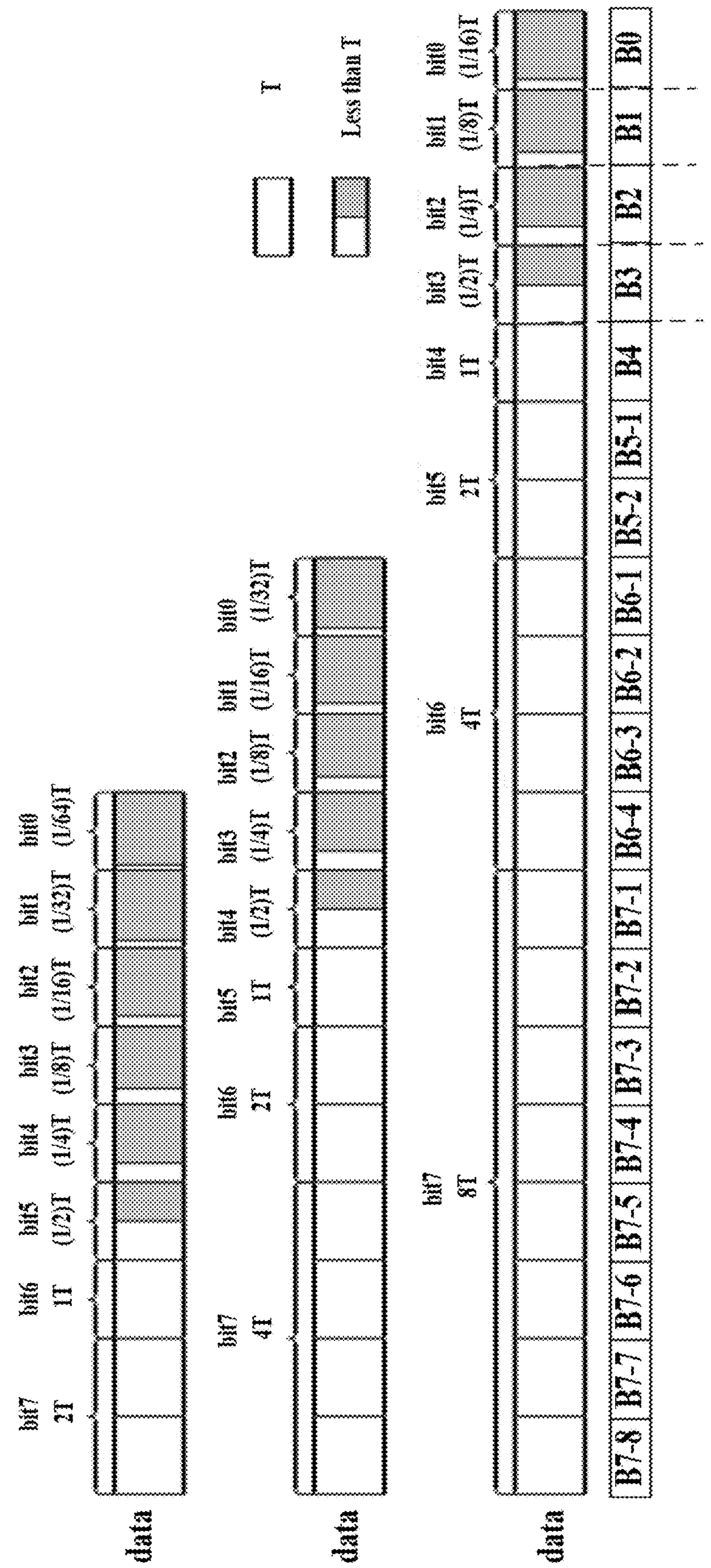
FIG. 2 is a schematic diagram of the composition of a plurality of bit data signals in a data signal provided by embodiments of the present application.

As shown in FIG. 2, the data signal Data includes a plurality of bit data signals (including 8 bit data signals from bit0 to bit7 for example), and the plurality of bit data signals have different weight coefficients (for example, the weight coefficient ratio of the 8 bit data signals from bit0 to bit7 is 1:2:4:8:16:32:64:128). The value of each bit data signal may be a first value (for example, "1") or a second value (for example, "0"), and the value and corresponding weight coefficient of each bit data signal are used to control the light-emitting duration or extinguishing duration of the sub-pixel Pi. For example, based on the unit duration T, FIG. 2 lists the following cases.

Case 1: the light-emitting duration or extinguishing durations of the sub-pixel Pi corresponding to the 8 bit data signals from bit0 to bit7 may be (1/64)T, (1/32)T, (1/16)T, (1/8)T, (1/4)T, (1/2)T, 1T, and 2T in sequence, that is, the light-emitting duration or extinguishing durations of the sub-pixel Pi corresponding to bits from bit0 to bit5 are less than the unit duration T, and the light-emitting duration or extinguishing durations of the sub-pixel Pi corresponding to bits from bit6 to bit7 are positive integer multiples of the unit duration T;

Case 2: the light-emitting duration or extinguishing durations of the sub-pixel Pi corresponding to the 8 bit data signals from bit0 to bit7 may be (1/32)T, (1/16)T, (1/8)T, (1/4)T, (1/2)T, 1T, 2T, and 4T in sequence, that is, the light-emitting duration or extinguishing durations of the sub-pixel Pi corresponding to bits from bit0 to bit4 are less than the unit duration T, and the light-emitting duration or extinguishing durations of the sub-pixel Pi corresponding to bits from bit5 to bit7 are integer multiples of the unit duration T;

Case 3: the light-emitting duration or extinguishing durations of the sub-pixel Pi corresponding to the 8 bit data signals from bit0 to bit7 may be (1/16)T, (1/8)T, (1/4)T, (1/2)T, 1T, 2T, 4T, and 8T in sequence, that is, the light-emitting duration or extinguishing durations of the sub-pixel Pi corresponding to bits from bit0 to bit3 are less than the unit duration T, and the light-emitting duration or extinguishing durations of the sub-pixel Pi corresponding to bits from bit4 to bit7 are integer multiples of the unit duration T.

Specifically, when the value of the bit data signal is the first value (i.e., "1"), the sub-pixel Pi can be controlled to emit light; the larger the weight coefficient, the longer the light-emitting duration of the sub-pixel Pi; and the smaller the weight coefficient, the shorter the light-emitting duration of the sub-pixel Pi. When the value of the bit data signal is the second value (i.e., "0"), the sub-pixel Pi can be controlled to extinguish; the larger the weight coefficient, the longer the extinguishing duration of the sub-pixel Pi; and the smaller the weight coefficient, the shorter the extinguishing duration of the sub-pixel Pi.

Therefore, the plurality of values and the plurality of weight coefficients corresponding to the plurality of bit data signals in the data signal Data are used to control the total light-emitting duration and total extinguishing duration of the sub-pixel Pi within one frame, so that the sub-pixel Pi presents corresponding brightness within the frame to represent the corresponding gray scale value.

The difference between the above three cases lies in that the light-emitting duration or extinguishing duration of the sub-pixel Pi corresponding to the same bit data signal (any one of bit0 to bit7) are different, so that the total duration of one frame is also different. For a bit data signal with a corresponding light-emitting duration or extinguishing duration of the sub-pixel Pi is an integer multiple of the unit duration T, the number of corresponding sub-frames may be equal to the multiple relationship between the above "corresponding light-emitting duration or extinguishing duration of the sub-pixel Pi" and the unit duration T; and for a bit data signal with a corresponding light-emitting duration or extinguishing duration of the sub-pixel Pi is less than the unit duration T, the number of corresponding sub-frames is 1. Thus, the following analysis is made.

In Case 1, the number of sub-frames (i.e., the number of sub-data signals) corresponding to bits from bit0 to bit6 is 1, and the number of sub-frames corresponding to bit7 is 2, so one frame includes 9 sub-frames, and the data signal Data includes 9 sub-data signals corresponding to the 9 sub-frames;

in Case 2, the number of sub-frames corresponding to bits from bit0 to bit5 is 1, and the number of sub-frames corresponding to bit6 and bit7 is 2 and 4 in sequence, so one frame includes 12 sub-frames, and the data signal Data includes 12 sub-data signals corresponding to the 12 sub-frames; and in Case 3, the number of sub-frames corresponding to bits from bit0 to bit4 is 1, and the number of sub-frames corresponding to bits from bit5 to bit7 is 2, 4, and 8 in sequence, so one frame includes 19 sub-frames, and the data signal Data includes 19 sub-data signals corresponding to the 19 sub-frames (for example, bits from bit0 to bit4 correspond to 5 sub-data signals from B0 to B4 respectively, bit5 corresponds to 2 sub-data signals from B5-1 to B5-2, bit6 corresponds to 4 sub-data signals from B6-1 to B6-4, and bit7 corresponds to 8 sub-data signals from B7-1 to B7-8).

For convenience of description, the present embodiment takes the above Case 3 as an example for illustration, that is, m=19, weight coefficients of at least some of the 19 sub-data signals (for example, 5 sub-data signals corresponding to bits from bit0 to bit4) are different, and each sub-data signal controls the light-emitting duration or extinguishing duration (for example, the durations corresponding to the five sub-data signals are (1/16)T, (1/8)T, (1/4)T, (1/2)T, and 1T in sequence) of the corresponding sub-pixel Pi according to the corresponding weight coefficient (for example, the weight coefficient ratio of the five sub-data signals corresponding to bits from bit0 to bit4 is 1:2:4:8:16).

The 19 sub-data signals (B0 to B4, B5-1 to B5-2, B6-1 to B6-4, B7-1 to B7-8) arranged in sequence in the data signal Data of each of the sub-pixels Pi in the first sub-pixel group correspond to sub-frames from the first sub-frame to the 19th sub-frame respectively.

Figure 3:
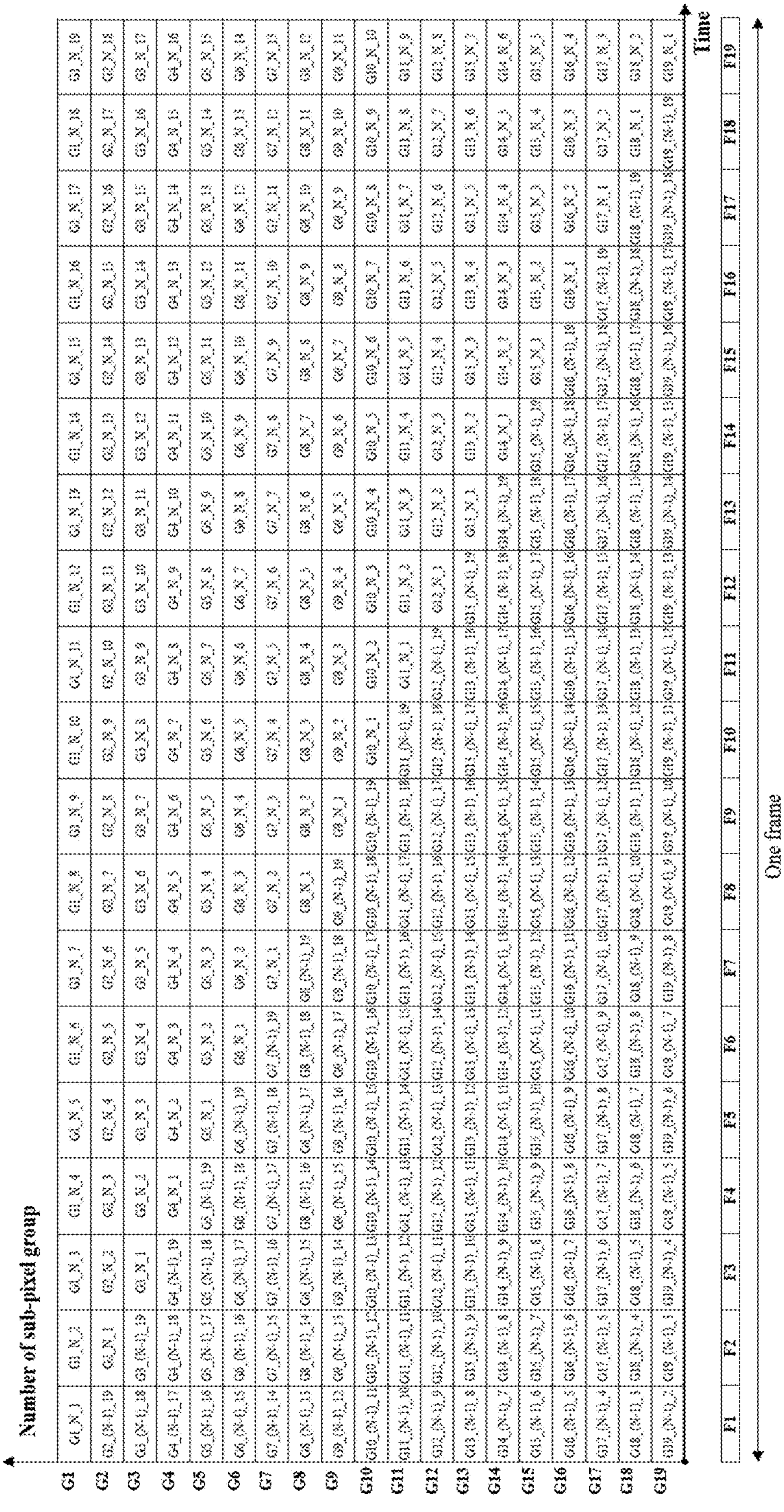
FIG. 3 is an arrangement diagram of a plurality of sub-data signals of different sub-pixel groups corresponding to a plurality of sub-frames within one frame provided by embodiments of the present application.

Based on the above definitions, as shown in FIG. 3, the source driver 30 in the present embodiment is configured to:

control each of the sub-pixels Pi in the first sub-pixel group G1 to display the image of the first sub-frame within the current frame, and control each of the sub-pixels Pi in the second sub-pixel group G2 to display the image of the previous frame (i.e., the (N−1)$^{th}$ frame), when n is equal to 2, that is, only the first sub-pixel group G1 and the second sub-pixel group G2 exist, and when the frame buffer 80 has completed buffering the data signals Data (including nineteen sub-data signals G1_N_1, and G1_N_2 to G1_N_19 arranged in sequence, the corresponding order between the nineteen sub-data signals and sub-frames from the first sub-frame F1 to the 19$^{th}$ sub-frame F19 is not limited) of each of the sub-pixels Pi in the first sub-pixel group G1 within the current frame (for example, the N$^{th}$ frame, where N is a positive integer greater than 1); or control each of the sub-pixels Pi in the first sub-pixel group to display the image of the first sub-frame within the current frame (corresponding to the sub-data signal G1_N_1), and control each of the sub-pixels Pi in the second sub-pixel group G2 and the third sub-pixel group G3 to display the image of the previous frame (i.e., the (N−1)$^{th}$ frame), when n is equal to 3, that is, only sub-pixel groups from the first sub-pixel group G1 to the third sub-pixel group G3 exist, and when the frame buffer 80 has completed buffering the data signals Data of each of the sub-pixels Pi in the first sub-pixel group G1 within the current frame (for example, the N$^{th}$ frame, where N is a positive integer greater than 1); and, control each of the sub-pixels Pi in the first sub-pixel group G1 and the second sub-pixel group G2 to display the image of the second sub-frame within the current frame, and control each of the sub-pixels Pi in the third sub-pixel group G3 to display the image of the previous frame, when n is equal to 3 and the frame buffer 80 has completed buffering the data signals Data (nineteen sub-data signals including G2_N_1, and from G2_N_2 to G2_N_19 arranged in sequence, the corresponding order between the nineteen sub-data signals and sub-frames from the first sub-frame F1 to the 19$^{th}$ sub-frame F19 is not limited) of each of the sub-pixels Pi in the second sub-pixel group G2 within the current frame; or control each of the sub-pixels Pi in the first sub-pixel group G1 to display the image of the first sub-frame within the current frame, and control each of the sub-pixels Pi in sub-pixel groups from the second sub-pixel group G2 to the n$^{th}$ sub-pixel group Gn to display the image of the previous frame (i.e., the (N−1)$^{th}$ frame), when n is greater than 3, that is, sub-pixel groups from the first sub-pixel group G1 to the n$^{th}$ sub-pixel group Gn exist, and when the frame buffer 80 has completed buffering the data signals Data of each of the sub-pixels Pi in the first sub-pixel group G1 within the current frame (for example, the N$^{th}$ frame, where N is a positive integer greater than 1); and, control each of the sub-pixels Pi in sub-pixel group from the first sub-pixel group to the j$^{th}$ sub-pixel group to display the image of the j$^{th}$ sub-frame within the current frame, and control each of the sub-pixels Pi in sub-pixel groups from the (j+1)$^{th}$ sub-pixel group to the n$^{th}$ sub-pixel group to display the image of the previous frame, when n is greater than 3 and the frame buffer 80 has completed buffering the data signals Data (including nineteen sub-data signals Gj_N_1, and Gj_N_2 to Gj_N_19 arranged in sequence) of each of the sub-pixels Pi in the j$^{th}$ sub-pixel group Gj within the current frame, where j is greater than 1 and less than n; and, control each of the sub-pixels Pi in sub-pixel groups from the first sub-pixel group G1 to the n$^{th}$ sub-pixel group Gn to display the image of the n$^{th}$ sub-frame within the current frame, when n is greater than 3 and the frame buffer 80 has completed buffering the data signals Data of each of the sub-pixels Pi in the n$^{th}$ sub-pixel group within the current frame, where j is a positive integer greater than 1 and less than n.

The n is less than or equal to m. That is, the number of sub-pixel groups is less than or equal to the number of sub-frames within one frame, so that the data signals Data of the sub-pixels Pi in all sub-pixel groups are buffered into the frame buffer 80 before a plurality of sub-pixels Pi display the image of the last sub-frame, ensuring that a plurality of sub-pixels Pi can present a complete display image of the frame before the end of the frame. For example, the number of sub-pixel groups and the number of sub-frames within one frame can both be 19.

As discussed above, the plurality of rows of pixels Pi can be divided into sub-pixel groups from the first sub-pixel group G1 to the n$^{th}$ sub-pixel group Gn along the column direction, and each sub-pixel group may include at least one row of sub-pixels Pi. Considering the actual situation, the above n is generally greater than 3, that is, the number of sub-pixel groups is generally greater than 3, and since the number of rows of sub-pixels Pi is in the hundreds, the number of rows of sub-pixels Pi included in each sub-pixel group is also multiple. For example, the number of rows of sub-pixels Pi is 720, and when the number of sub-pixel groups and the number of sub-frames within one frame are both 19, the first sub-pixel group G1 includes sub-pixels Pi with rows from the first row to the $38^{th}$ row, the second sub-pixel group G2 includes sub-pixels Pi with rows from the $39^{th}$ row to the $76^{th}$ row, . . . , the $18^{th}$ sub-pixel group G18 includes sub-pixels Pi with rows from the $647^{th}$ row to the $684^{th}$ row, and the $19^{th}$ sub-pixel group G19 includes sub-pixels Pi with rows from the $685^{th}$ row to the $720^{th}$ row.

It should be noted that in the comparative example, generally, after the frame buffer 80 obtains all gray scale signals of all sub-pixels Pi within one frame and converts them into a plurality of the above data signals Data for buffering, the source driver 30 will sequentially output a plurality of data signals Data corresponding to a plurality of rows of sub-pixels Pi to present the image of the frame, causing a delay greater than the transmission time of one frame of data signals Data between the display of a frame image and the input of the corresponding plurality of rows of data signals Data, thereby resulting in a large time difference between an action of a user and a system response in application scenarios such as virtual reality, and reducing user experience.

It can be understood that, in the present embodiment, a plurality of rows of sub-pixels Pi are divided into a plurality of sub-pixel groups. On the premise that the frame buffer 80 sequentially acquires data signals Data of each of sub-pixel groups from the first sub-pixel group G1 to the $n^{th}$ sub-pixel group Gn in the current frame (the $N^{th}$ frame), when the frame buffer 80 acquires the data signals Data of the first sub-pixel group G1 in the current frame (the duration consumed in this stage must be less than the duration for "the frame buffer 80 to acquire all gray scale signals of all sub-pixels Pi within one frame and convert them into a plurality of the above data signals Data"), considering that the data signals Data of subsequent sub-pixel groups in the previous frame are still buffered in the frame buffer 80, at this time, the first sub-pixel group G1 is controlled to display the image of the first sub-frame within the current frame, and each sub-pixel Pi in sub-pixel groups from the second sub-pixel group G2 to the $n^{th}$ sub-pixel group Gn is controlled to display the image of the previous frame;

By analogy, the data signals Data of a middle sub-pixel group in the current frame are also buffered in the frame buffer 80. Similarly, it can be known that the data signals Data of this sub-pixel group and the sub-pixel groups before this sub-pixel group in the current frame are all buffered in the frame buffer 80, and the data signals Data of the sub-pixel groups after this sub-pixel group in the previous frame are all buffered in the frame buffer 80, so the two can display the image of the corresponding sub-frame within the current frame and the image of the previous frame respectively;

By analogy, until the data signals Data of the last sub-pixel group in the current frame are also buffered in the frame buffer 80, similarly, it can be known that the data signals Data of all sub-pixel groups in the current frame are all buffered in the frame buffer 80, so all sub-pixel groups display the image of the corresponding sub-frame within the current frame, and all sub-pixel groups sequentially display the images of subsequent sub-frames in the subsequent sub-frames (if any);

That is, in the present embodiment, when the frame buffer 80 acquires the data signals Data of the first sub-pixel group G1 in the current frame, the first sub-pixel group G1 is controlled to display the image of the first sub-frame; by analogy, when acquiring the data signals Data of subsequent sub-pixel groups in the current frame, several corresponding sub-pixel groups are controlled to display the images of corresponding sub-frames, until the data signals Data of the last sub-pixel group in the current frame are acquired, all sub-pixel groups can gradually display the corresponding sub-frames until the image of the last sub-frame, so as to complete the display of a complete frame image. As a result, the display of the frame image starts when the frame buffer 80 acquires the data signals Data of the first sub-pixel group G1 in the current frame, and the complete image of the frame is displayed earliest when the data signals Data of the last sub-pixel group in the current frame are acquired, thereby shortening the interval between the display of a frame image and the input of data signals Data of the corresponding plurality of rows of sub-pixels Pi, reducing the time difference between an action of a user and a system response, and improving user experience.

In some embodiments, as shown in FIG. 1 and FIG. 2, each of gate line groups from the first gate line group to the $(n-1)^{th}$ gate line group includes the same number of the gate lines 50 (that is, each of the first (n−1) sub-pixel groups includes the same number of rows of sub-pixels Pi), and the number of the gate lines 50 in the $n^{th}$ gate line group is less than or equal to the number of the gate lines 50 in each of gate line groups from the first gate line group to the $(n-1)^{th}$ gate line group (that is, the number of rows of sub-pixels Pi included in the last sub-pixel group is less than the number of rows of sub-pixels Pi included in each of the first (n−1) sub-pixel groups).

Specifically, the number of sub-pixel groups can be set according to the number of sub-frames in one frame, as long as the number of sub-pixel groups is less than the number of sub-frames. A larger number of sub-pixel groups means that the data signals Data of the sub-pixel groups need to be buffered more times to complete the writing of all data signals Data of the frame, and also means that the image of the first sub-frame corresponding to the first sub-pixel group G1 can be displayed after a shorter duration. The number of rows of sub-pixels Pi in different sub-pixel groups can be the same or different.

The plurality of rows of sub-pixels Pi can be evenly divided into a plurality of sub-pixel groups; when the plurality of rows of sub-pixels cannot be evenly divided, the number of rows of sub-pixels Pi can be prioritized to be taken modulo according to the number of sub-pixel groups, and the remainder is used as the number of rows of sub-pixels Pi in the last sub-pixel group, and the number of rows of sub-pixels Pi in the previous several sub-pixel groups can be the same.

For example, when the number of rows of sub-pixels Pi is 720, and the number of sub-pixel groups and the number of sub-frames within one frame are both 19, the first sub-pixel group G1 includes sub-pixels Pi with rows from the first row to the $38^{th}$ row, the second sub-pixel group G2 includes sub-pixels Pi with rows from the $39^{th}$ row to the $76^{th}$ row, . . . , the $18^{th}$ sub-pixel group G18 includes sub-pixels Pi with rows from the $647^{th}$ row to the $684^{th}$ row, and the $19^{th}$ sub-pixel group G19 includes sub-pixels Pi with rows from the $685^{th}$ row to the $720^{th}$ row. At a refresh rate of 60 Hz, the interval between the display of a frame image and the input of the corresponding plurality of rows of data signals Data is 1/60/19≈0.88 ms, which is reduced to 1/19 of that in the above comparative example, that is, the time difference between an action of a user and a system response is reduced.

In some embodiments, as shown in FIG. 1 to FIG. 5, when m is greater than 2, that is, one frame includes at least 2 sub-frames (taking m=19 as an example here), the arrangement order of the m sub-data signals arranged in sequence within the frame buffer 80 in the data signal Data of each of the sub-pixels Pi in the second sub-pixel group G2 corresponds to the second sub-frame to the $m^{th}$ sub-frame, and the first sub-frame in sequence.

Figure 4:
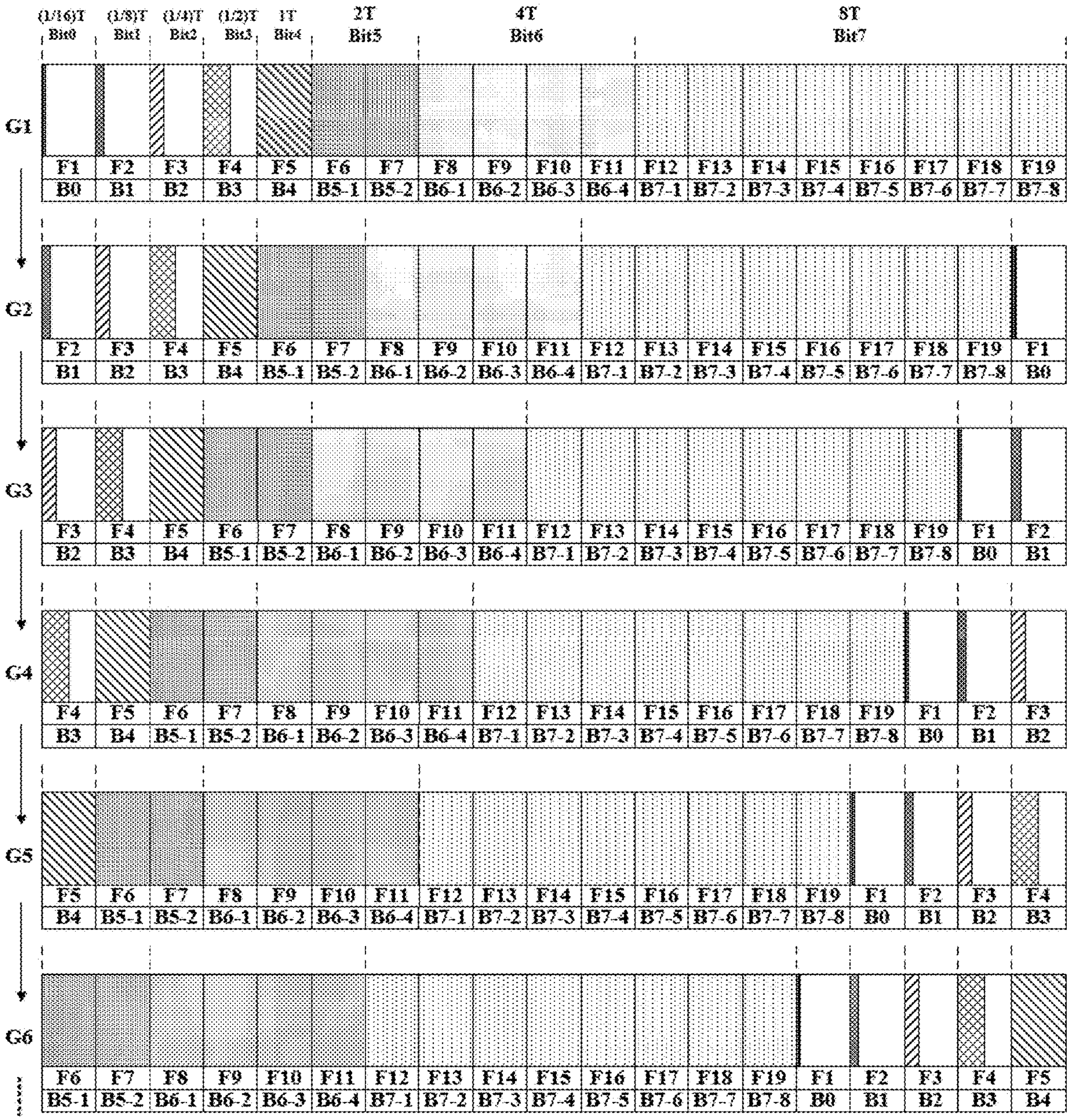
FIG. 4 and FIG. 5 are schematic diagrams of the buffering arrangement order of a plurality of sub-data signals in data signals of sub-pixels in different sub-pixel groups provided by embodiments of the present application.
Figure 5:

As shown in FIG. 4 and FIG. 5, the data signal Data of each sub-pixel Pi includes nineteen sub-data signals from B0 to B4, from B5-1 to B5-2, from B6-1 to B6-4, and from B7-1 to B7-8 corresponding to the nineteen sub-frames from F1 to F19 in sequence. However, the buffering arrangement order of the nineteen sub-data signals in the frame buffer 80 can be the same as or different from the above order. For example, the arrangement order of the nineteen sub-data signals of the first sub-pixel group G1 in the frame buffer 80 in FIG. 4 is from B0 to B4, from B5-1 to B5-2, from B6-1 to B6-4, and from B7-1 to B7-8, and the arrangement order of the nineteen sub-data signals of the first sub-pixel group G1 in the frame buffer 80 in FIG. 5 is B7-2, B6-4, B1, B0, B7-6, B5-1, B6-1, B7-4, B7-8, B6-3, B7-1, B2, B7-3, B3, B4, B7-4, B5-2, B7-7, and B6-2.

For convenience of description, the arrangement order of the nineteen sub-data signals of the first sub-pixel group G1 in the frame buffer 80 in FIG. 4 is taken as an example for illustration.

For example, the arrangement order of the m sub-data signals arranged in sequence in the data signal Data of the sub-pixels Pi in the second sub-pixel group G2 in the present embodiment corresponds to sub-frames from the second sub-frame F2 to the $m^{th}$ sub-frame Fm, and the first sub-frame F1 in sequence, that is, the arrangement order of the nineteen sub-data signals in the data signal Data of the second sub-pixel group G2 corresponds to sub-frames from the second sub-frame F2 to the $19^{th}$ sub-frame F19, and the first sub-frame F1 in sequence, i.e., according to the order from B1 to B4, from B5-1 to B5-2, from B6-1 to B6-4, from B7-1 to B7-8, and B0.

It can be understood that after the data signal Data of the second sub-pixel group G2 is stored in the frame buffer 80, the first sub-pixel group G1 is about to display the image of the sub-data signal (i.e., the corresponding B1) of the second sub-frame F2 of the current frame. Therefore, to ensure the accuracy of the image of the second sub-frame F2 (that is, to achieve the corresponding weight coefficient), the second sub-pixel group G2 also needs to acquire the sub-data signal (i.e., the corresponding B1) of the second sub-frame F2 from the data signal Data to display the image of the second sub-frame F2. For the convenience of sequential reading of the plurality of sub-data signals in the data signal Data of the second sub-pixel group G2, the arrangement order of the plurality of sub-data signals in the data signal Data of the second sub-pixel group G2 can correspond to sub-frames from the second sub-frame F2 to the $19^{th}$ sub-frame F19, and the first sub-frame F1 in sequence.

Further, when n is greater or equal to 3, m is greater than h, and h is a positive integer greater than 2 and less than n, that is, when the number of sub-pixel groups is greater than 2 and the number of sub-frames included in one frame is greater than 3, for each of the third sub-pixel group G3 and the subsequent sub-pixel groups, the arrangement order of the m sub-data signals (i.e., nineteen sub-data signals) arranged in sequence within the frame buffer 80 in the data signal Data of each of the sub-pixels Pi in the $h^{th}$ sub-pixel group Gh corresponds to sub-frames from the $h^{th}$ sub-frame Fh to the $m^{th}$ sub-frame Fm, and sub-frames from the first sub-frame F1 to the $(h-1)^{th}$ sub-frame Fh−1 in sequence.

For example, when h=3, the arrangement order of the m sub-data signals arranged in sequence in the data signal Data of the sub-pixels Pi in the third sub-pixel group G3 in the present embodiment corresponds to sub-frames from the third sub-frame F3 to the $m^{th}$ sub-frame Fm, and sub-frames from the first sub-frame F1 to the second sub-frame F2 in sequence, that is, the arrangement order of the nineteen sub-data signals in the data signal Data of the third sub-pixel group G3 corresponds to sub-frames from the third sub-frame to the $19^{th}$ sub-frame F19, and sub-frames from the first sub-frame F1 to the second sub-frame F2 in sequence, i.e., according to the order from B2 to B4, from B5-1 to B5-2, from B6-1 to B6-4, from B7-1 to B7-8, B0, and B1.

Until h=n, the arrangement order of the m sub-data signals arranged in sequence in the data signal Data of the sub-pixels Pi in the $n^{th}$ sub-pixel group Gn in the present embodiment corresponds to sub-frames from the $n^{th}$ sub-frame Fn to the $m^{th}$ sub-frame Fm, and sub-frames from the first sub-frame F1 to the $(n-1)^{th}$ sub-frame Fn−1 in sequence; if n=m, the arrangement order of the m sub-data signals arranged in sequence corresponds to the $m^{th}$ sub-frame Fm, and sub-frames from the first sub-frame F1 to the $(m-1)^{th}$ sub-frame Fm−1 in sequence.

Similarly, after the data signal Data of the $h^{th}$ sub-pixel group Gh is stored in the frame buffer 80, sub-pixel groups from the first sub-pixel group G1 to the $h^{th}$ sub-pixel group Gh are about to display the image of the sub-data signal of the $h^{th}$ sub-frame Fh of the current frame. Therefore, to ensure the accuracy of the image of the $h^{th}$ sub-frame Fh (that is, to achieve the corresponding weight coefficient), the $h^{th}$ sub-pixel group Gh also needs to acquire the sub-data signal of the $h^{th}$ sub-frame Fh from the data signal Data to display the image of the $h^{th}$ sub-frame. Thus, the arrangement order of a plurality of sub-data signals in the data signal Data of the $h^{th}$ sub-pixel group Gh can correspond to sub-frames from the $h^{th}$ sub-frame Fh to the $19^{th}$ sub-frame F19, and sub-frames from the first sub-frame F1 to the $(h-1)^{th}$ sub-frame Fh−1 in sequence.

It can be understood that in the present embodiment, the arrangement order of the m sub-data signals of each sub-pixel group is shifted forward by one bit compared with the arrangement order of the nineteen sub-data signals of the previous sub-pixel group, and the first bit of the sub-data signal is moved to be as the last bit of the sub-data signal, so that the corresponding plurality of sub-pixel groups within the same sub-frame can control the corresponding sub-pixels Pi to emit light or extinguish for the same duration with the same weight coefficient according to the sub-data signal corresponding to the sub-frame. Especially for sub-frames (called blanking sub-frames) where "the corresponding light-emitting duration or extinguishing duration of the sub-pixel Pi" is less than the unit duration T, thereby ensuring that the corresponding sub-pixels Pi emit light or extinguish for the same duration.

In some embodiments, as shown in FIG. 1 to FIG. 4, some of the sub-data signals (i.e., the above B0 to B4) with sequentially increasing weight coefficients corresponding to each of the sub-pixels Pi in the first sub-pixel group G1 are continuously arranged in the corresponding m sub-data signals arranged in sequence.

As shown in FIG. 4, taking m=19 as an example, the five sub-data signals with sequentially increasing weight coefficients (i.e., the above B0 to B4) in the nineteen sub-data signals of the first sub-pixel group G1 are continuously arranged in the above nineteen sub-data signals from B0 to B4, from B5-1 to B5-2, from B6-1 to B6-4, and from B7-1 to B7-8 arranged in sequence. As analyzed above, the arrangement order of the nineteen sub-data signals of each sub-pixel group is shifted forward by one bit compared with the arrangement order of the nineteen sub-data signals of the previous sub-pixel group, and the first bit of the sub-data signal is moved to be as the last bit of the sub-data signal.

Therefore, the first sub-pixel group G1 in the present embodiment can sequentially display the images corresponding to sub-frames from the first sub-frame F1 to the $5^{th}$ sub-frame F5 with sequentially increasing weight coefficients (i.e., corresponding to the above B0 to B4 respectively).

In other embodiments, as shown in FIG. 1 to FIG. 3, and FIG. 5, some of the sub-data signals with sequentially increasing weight coefficients (i.e., the above B0 to B4) corresponding to each of the sub-pixels Pi in the first sub-pixel group G1 are dispersedly arranged in the corresponding m sub-data signals arranged in sequence.

As shown in FIG. 5, taking m=19 as an example, the five sub-data signals with sequentially increasing weight coefficients (i.e., the above B0 to B4) in the nineteen sub-data signals of the first sub-pixel group G1 are dispersedly arranged in the above nineteen sub-data signals from B0 to B4, from B5-1 to B5-2, from B6-1 to B6-4, and from B7-1 to B7-8 arranged in sequence, that is, the five sub-data signals corresponding to B0 to B4 are dispersedly arranged. The specific degree of dispersion is not limited; each two of the five can be arranged at intervals (i.e., a sub-data signal corresponding to a blanking sub-frame is arranged between them), or at most four of the five can be arranged continuously.

And as analyzed above, the arrangement order of the nineteen sub-data signals of each sub-pixel group is shifted forward by one bit compared with the arrangement order of the nineteen sub-data signals of the previous sub-pixel group, and the first bit of the sub-data signal is moved to be as the last bit of the sub-data signal, so the five sub-data signals corresponding to B0 to B4 of each sub-pixel group will not be continuously arranged either.

Therefore, in the present embodiment, the sub-data signals of each of the eight bit data signals from bit0 to bit7 of the first sub-pixel group G1 are arranged in a disorderly manner. Similarly, due to following the above rule of "all shifting forward by one bit", the sub-data signals of each of the eight bit data signals from bit0 to bit7 of other sub-pixel groups are also arranged in a corresponding disorderly manner. As a result, compared with the plurality of sub-pixel groups in FIG. 4, the plurality of sub-pixel groups in the present embodiment reduce the number of consecutively-arranged multiple sub-data signals where "the corresponding light-emitting duration or extinguishing duration of the sub-pixel Pi is equal to the unit duration T" by dispersedly arranging some sub-data signals with sequentially increasing weight coefficients (i.e., sub-data signals corresponding to blanking sub-frames) among a plurality of sub-data signals, thereby avoiding controlling the corresponding sub-pixels Pi to continuously emit light or extinguish in a plurality of consecutive sub-frames according to the values of the corresponding bit data signals, so as to shorten the duration that the sub-pixels Pi continuously emit light or extinguish, and thus reduce the risk of flicker caused by long-term changes in light emission or extinction when the sub-pixels Pi switch from the bit data signal to a bit data signal with a different value.

In some embodiments, as shown in FIG. 1 to FIG. 5, the source driver 30 is configured to:

control each of the sub-pixels Pi in sub-pixel groups from the first sub-pixel group G1 to the $j^{th}$ sub-pixel group Gj to display the image of the $j^{th}$ sub-frame within the current frame according to the sub-data signal of the $j^{th}$ sub-frame of the current frame, and control each of the sub-pixels Pi in a kth sub-pixel group among sub-pixel groups from the $(j+1)^{th}$ sub-pixel group Gj+1 to the $n^{th}$ sub-pixel group Gn to display the image of the $(m+j-k+1)^{th}$ sub-frame within the previous frame according to the $(m+j-k+1)^{th}$ sub-data signal of the previous frame, when the frame buffer 80 has completed buffering the data signals Data of each of the sub-pixels Pi in the $j^{th}$ sub-pixel group Gj within the current frame, where k is a positive integer greater than or equal to j+1, and less than or equal to n.

As analyzed above, within the $N^{th}$ frame, the m sub-data signals (i.e., nineteen sub-data signals) arranged in sequence within the frame buffer 80 in the data signal Data of the sub-pixels Pi in the $h^{th}$ sub-pixel group Gh correspond to sub-frames from the $h^{th}$ sub-frame Fh to the $m^{th}$ sub-frame Fm, and sub-frames from the first sub-frame F1 to the $(h-1)^{th}$ sub-frame Fh−1 in sequence. Taking FIG. 4 as an example, where m=19, as shown in FIG. 5:

- the nineteen sub-data signals G1_N_1, and G1_N_2 to G1_N_19 arranged in sequence corresponding to the first sub-pixel group G1 are B0 to B4, B5-1 to B5-2, B6-1 to B6-4, and B7-1 to B7-8 in sequence, and correspond to sub-frames from the first sub-frame F1 to the $19^{th}$ sub-frame F19 in sequence;
- the nineteen sub-data signals G2_N_1, and G2_N_2 to G2_N_19 arranged in sequence corresponding to the second sub-pixel group G2 are B1 to B4, B5-1 to B5-2, B6-1 to B6-4, B7-1 to B7-8, and B0 in sequence, and correspond to sub-frames from the second sub-frame F2 to the $19^{th}$ sub-frame F19, and the first sub-frame F1 in sequence;
- the nineteen sub-data signals G3_N_1, and G3_N_2 to G3_N_19 arranged in sequence corresponding to the third sub-pixel group G3 are B2 to B4, B5-1 to B5-2, B6-1 to B6-4, B7-1 to B7-8, B0, and B1 in sequence, and correspond to sub-frames from the third sub-frame F3 to the $19^{th}$ sub-frame F19, and sub-frames from the first sub-frame F1 to the second sub-frame F2 in sequence;
- and so on;
- the nineteen sub-data signals G19_N_1, and G19_N_2 to G19_N_19 arranged in sequence corresponding to the $19^{th}$ sub-pixel group G19 correspond to the $19^{th}$ sub-frame F19, and sub-frames from the first sub-frame F1 to the $18^{th}$ sub-frame F18 in sequence.

It should be noted that, as shown in FIG. 5, since the data signals Data of sub-pixel groups from the second sub-pixel group G2 to the $19^{th}$ sub-pixel group G19 in the $N^{th}$ frame are buffered into the frame buffer 80 only before displaying the second sub-frame F2, before displaying the third sub-frame F3, and so on until before displaying the $19^{th}$ sub-frame F19 in sequence, the following analysis is made:

since the data signals Data of the second sub-pixel group G2 in the $N^{th}$ frame are not buffered into the frame buffer 80 until the second sub-frame F2, the buffer space of the frame buffer 80 corresponding to the data signals Data of the second sub-pixel group G2 within the first sub-frame F1 is located at the outermost position, while the sub-data signal being read is the sub-data signal G2_(N−1)_19 of the $(N-1)^{th}$ frame; and since the data signals Data of the third sub-pixel group G3 in the $N^{th}$ frame are not buffered into the frame buffer 80 until the third sub-frame F3, the buffer space of the frame buffer 80 corresponding to the data signals Data of the third sub-pixel group G3 within the first sub-frame F1 and the second sub-frame F2 in sequence is located at the outermost position, while the sub-data signals being read are the sub-data signal G3_(N−1)_18 of the $(N-1)^{th}$ frame and the sub-data signal G3_(N−1)_19 of the $(N-1)^{th}$ frame;

and so on;

since the data signals Data of the $19^{th}$ sub-pixel group G19 in the $N^{th}$ frame are not buffered into the frame buffer 80 until the $19^{th}$ sub-frame F19, the buffer space of the frame buffer 80 corresponding to the data signals Data of the $19^{th}$ sub-pixel group G19 within the first sub-frame F1 and sub-frames from the second sub-frame F2 to the $18^{th}$ sub-frame F18 in sequence is located at the outermost position, while the sub-data signals being read are the sub-data signal G19_(N−1)_2 of the $(N-1)^{th}$ frame and sub-data signals from the sub-data signal G19_(N−1)_3 of the $(N-1)^{th}$ frame to the sub-data signal G19_(N−1)_19 of the $(N-1)^{th}$ frame.

As analyzed above, when the frame buffer 80 has completed buffering the data signals Data of the first sub-pixel group G1 in the second frame, although the data signals Data of sub-pixel groups from the second sub-pixel group G2 to the $n^{th}$ sub-pixel group Gn in the first frame are all buffered in the frame buffer 80, it is considered that the eighteen buffer spaces of the frame buffer 80 respectively corresponding to the data signals Data of the second sub-pixel group G2, the data signals Data of the third sub-pixel group G3, and so on until the data signals Data of the $19^{th}$ sub-pixel group G19 within the first sub-frame F1 are located at the outermost position, while the sub-data signals being read are G2_(N−1)_19, G3_(N−1)_18, and so on until G19_(N−1)_2 in sequence;

therefore, for the convenience of reading the above sub-data signals, within the first sub-frame, in addition to controlling the first sub-pixel group G1 to display the image of the first sub-frame within the current frame according to the sub-data signal G1_N_1 of the first sub-frame F1 of the current frame, sub-pixel groups from the second sub-pixel group G2 to the $n^{th}$ sub-pixel group Gn are also controlled to display the image of the first sub-frame within the previous frame according to the respective $19^{th}$ sub-data signal G2_(N−1)_19 thereof within the previous frame and the $18^{th}$ sub-data signal G3_(N−1)_18 within the previous frame, respectively.

Further, for example, when m=n=19 and j=3 in the present embodiment, the following understanding is obtained:

when the frame buffer 80 has completed buffering the data signals Data of the third sub-pixel group G3 in the $N^{th}$ frame, the sub-pixels Pi in sub-pixel groups from the first sub-pixel group G1 to the third sub-pixel group G3 are controlled to display the image of the third sub-frame within the $N^{th}$ frame according to the third sub-data signals G1_N_3, G2_N_2, and G3_N_1 of the $N^{th}$ frame;

each sub-pixel Pi in the kth sub-pixel group among sub-pixel groups from the $4^{th}$ sub-pixel group G4 to the $19^{th}$ sub-pixel group G19 is controlled to display the image of the $(23-k)^{th}$ sub-frame within the $(N-1)^{th}$ frame according to the $(23-k)^{th}$ sub-data signal of the $(N-1)^{th}$ frame;

when k=4, each sub-pixel Pi in the $4^{th}$ sub-pixel group is controlled to display the image of the $19^{th}$ sub-frame within the $(N-1)^{th}$ frame according to the $19^{th}$ sub-data signal G4_(N−1)_19 of the $(N-1)^{th}$ frame; and when k=5, each sub-pixel Pi in the $5^{th}$ sub-pixel group is controlled to display the image of the $18^{th}$ sub-frame within the $(N-1)^{th}$ frame according to the $18^{th}$ sub-data signal G5_(N−1)_18 of the $(N-1)^{th}$ frame.

Therefore, since after the data signals Data of one sub-pixel group in the current frame is written, it is necessary to control the plurality of sub-pixel groups (the sub-pixel group and the sub-pixel groups before it) that have buffered the data signals Data of the current frame to display the image of the corresponding sub-frame, after buffering the data signals Data of the $j^{th}$ sub-pixel group Gj, sub-pixel groups from the first sub-pixel group G1 to the $j^{th}$ sub-pixel group Gj that have stored the data signals Data of the current frame display the image of the $j^{th}$ sub-frame. At this time, although the data signals Data of sub-pixel groups from the $(j+1)^{th}$ sub-pixel group Gj+1 to the $n^{th}$ sub-pixel group Gn in the previous frame are all buffered in the frame buffer 80, for the convenience of reading, each of sub-pixel groups from the $(j+1)^{th}$ sub-pixel group Gj+1 to the $n^{th}$ sub-pixel group Gn can read the corresponding sub-data signals in the above manner to display the image of the corresponding sub-frame.

Embodiments of the present application provide a driving method of a display device. Technical features such as sub-pixels Pi and gate lines 50 in the display device can refer to the relevant discussions above. The driving method of the display device includes but is not limited to the following embodiments and combinations of the following embodiments.

Figure 6:
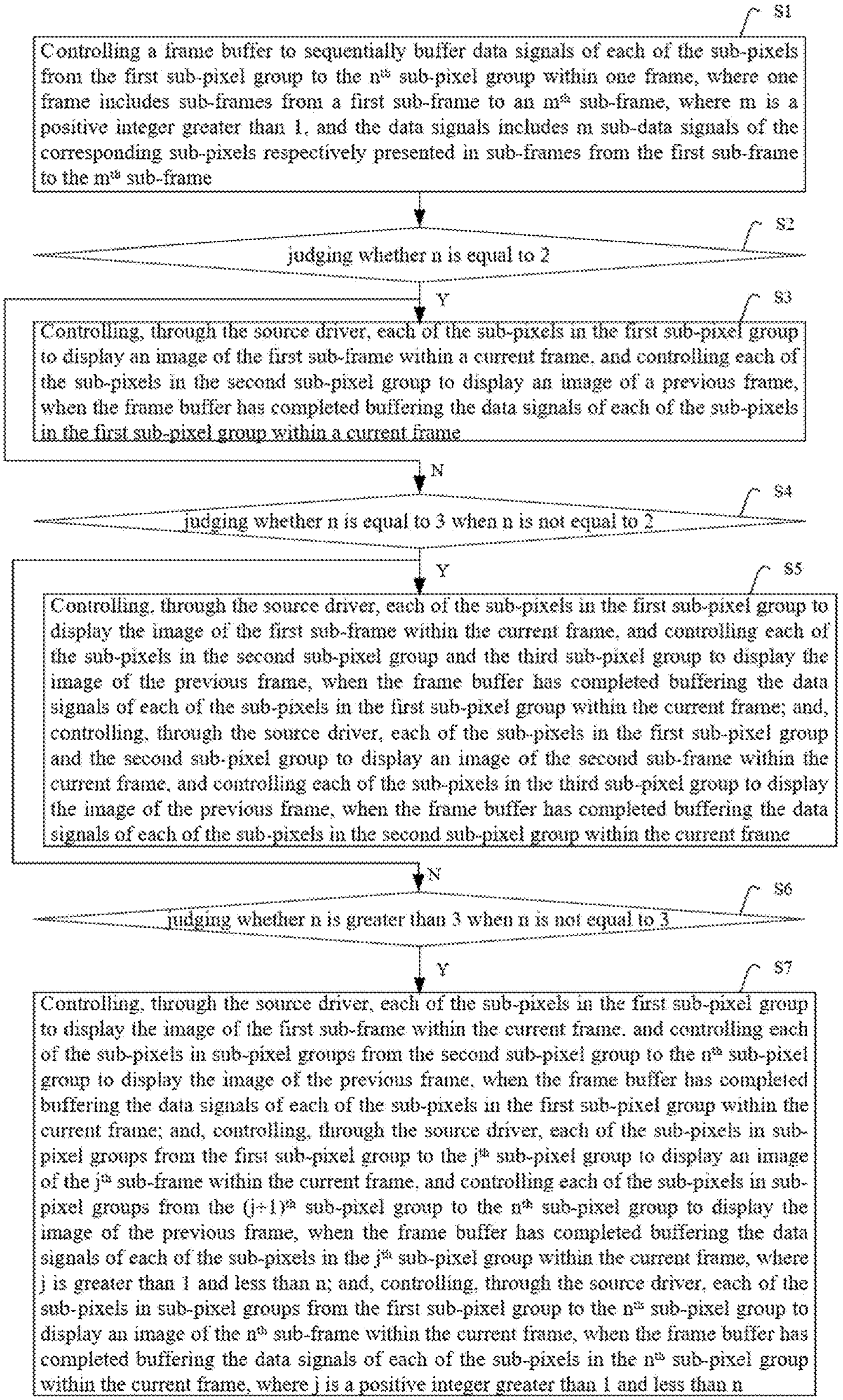
FIG. 6 is a flow chart of a driving method of a display device provided by embodiments of the present application.

In some embodiments, as shown in FIG. 6, the driving method of the display device includes but is not limited to the following steps and combinations between the following steps:

S1, controlling a frame buffer to sequentially buffer data signals of each of the sub-pixels from the first sub-pixel group to the $n^{th}$ sub-pixel group within one frame, where one frame includes sub-frames from a first sub-frame to an $m^{th}$ sub-frame, where m is a positive integer greater than 1, and the data signals includes m sub-data signals of the corresponding sub-pixels respectively presented in sub-frames from the first sub-frame to the $m^{th}$ sub-frame;

Herein, the frame buffer 80, data signals Data, sub-frames, and data signals can refer to the relevant discussions above, that is, data signals Data from the data signals Data of the first sub-pixel group G1 in the current frame to the data signals Data of the $n^{th}$ sub-pixel group Gn in the current frame are sequentially buffered into the frame buffer 80, and each sub-frame has a corresponding sub-data signal;

S2, judging whether n is equal to 2;

When n is equal to 2, the following step is executed:

S3, controlling, through the source driver, each of the sub-pixels in the first sub-pixel group to display an image of the first sub-frame within a current frame, and controlling each of the sub-pixels in the second sub-pixel group to display an image of a previous frame, when the frame buffer has completed buffering the data signals of each of the sub-pixels in the first sub-pixel group within a current frame;

That is, only the first sub-pixel group G1 and the second sub-pixel group G2 exist; at this time, the first sub-pixel group G1 is controlled to display the image of the first sub-frame within the current frame, and the second sub-pixel group G2 is controlled to display the image of the previous frame; for specific details, refer to the relevant discussions above;

S4, judging whether n is equal to 3 when n is not equal to 2;

When n is equal to 3, the following step is executed:

S5, controlling, through the source driver, each of the sub-pixels in the first sub-pixel group to display the image of the first sub-frame within the current frame, and controlling each of the sub-pixels in the second sub-pixel group and the third sub-pixel group to display the image of the previous frame, when the frame buffer has completed buffering the data signals of each of the sub-pixels in the first sub-pixel group within the current frame; and, controlling, through the source driver, each of the sub-pixels in the first sub-pixel group and the second sub-pixel group to display an image of the second sub-frame within the current frame, and controlling each of the sub-pixels in the third sub-pixel group to display the image of the previous frame, when the frame buffer has completed buffering the data signals of each of the sub-pixels in the second sub-pixel group within the current frame;

That is, only sub-pixel groups from the first sub-pixel group G1 to the third sub-pixel group G3 exist; at this time, the first sub-pixel group G1 is controlled to display the image of the first sub-frame within the current frame, and the second sub-pixel group G2 and the third sub-pixel group G3 are controlled to display the image of the previous frame; for specific details, refer to the relevant discussions above;

S6, judging whether n is greater than 3 when n is not equal to 3;

When n is greater than 3, the following step is executed:

S7, controlling, through the source driver, each of the sub-pixels in the first sub-pixel group to display the image of the first sub-frame within the current frame, and controlling each of the sub-pixels in sub-pixel groups from the second sub-pixel group to the $n^{th}$ sub-pixel group to display the image of the previous frame, when the frame buffer has completed buffering the data signals of each of the sub-pixels in the first sub-pixel group within the current frame; and, controlling, through the source driver, each of the sub-pixels in sub-pixel groups from the first sub-pixel group to the $j^{th}$ sub-pixel group to display an image of the $j^{th}$ sub-frame within the current frame, and controlling each of the sub-pixels in sub-pixel groups from the $(j+1)^{th}$ sub-pixel group to the $n^{th}$ sub-pixel group to display the image of the previous frame, when the frame buffer has completed buffering the data signals of each of the sub-pixels in the $j^{th}$ sub-pixel group within the current frame, where j is greater than 1 and less than n; and, controlling, through the source driver, each of the sub-pixels in sub-pixel groups from the first sub-pixel group to the $n^{th}$ sub-pixel group to display an image of the $n^{th}$ sub-frame within the current frame, when the frame buffer has completed buffering the data signals of each of the sub-pixels in the $n^{th}$ sub-pixel group within the current frame, where j is a positive integer greater than 1 and less than n;

That is, only sub-pixel groups from the first sub-pixel group G1 to the $n^{th}$ sub-pixel group Gn exist; when the data signals Data of the first sub-pixel group G1 within the current frame are completely buffered, the first sub-pixel group G1 is controlled to display the image of the first sub-frame within the current frame, and sub-pixel groups from the second sub-pixel group G2 to the $n^{th}$ sub-pixel group Gn are controlled to display the image of the previous frame; for specific details, refer to the relevant discussions above;

Further, the specific details of the two cases where the data signals Data of the $j^{th}$ sub-pixel group Gj within the current frame are completely buffered and where the data signals Data of the $n^{th}$ sub-pixel group Gn within the current frame are completely buffered also refer to the relevant discussions above.

In some embodiments, weight coefficients of at least some of the m sub-data signals are different, and each of the sub-data signals controls the duration of light-emitting or extinguishing of the corresponding sub-pixel Pi according to the corresponding weight coefficient; the above step S1 includes but is not limited to the following steps:

S11, controlling the frame buffer to sequentially buffer the m sub-data signals corresponding respectively to the sub-frames from the first sub-frame to the $m^{th}$ sub-frame in the data signals of each of the sub-pixels in the first sub-pixel group; and S12, controlling the frame buffer to sequentially buffer the m sub-data signals corresponding respectively to the sub-frames from the second sub-frame to the $m^{th}$ sub-frame, and the first sub-frame in the data signals of each of the sub-pixels in the second sub-pixel group when m is greater than 2.

Further, the above step S1 further includes but is not limited to the following steps:

S13, controlling the frame buffer to sequentially buffer the m sub-data signals corresponding to sub-frames from the $h^{th}$ sub-frame to the $m^{th}$ sub-frame and sub-frames from the first sub-frame to the $(h-1)^{th}$ sub-frame respectively in the data signals of each of the sub-pixels in the $h^{th}$ sub-pixel group, when n is greater than or equal to 3 and m is greater than h, where h is a positive integer greater than 2 and less than n.

The above steps S11 to S13 can refer to the relevant discussions about FIG. 4 and FIG. 5 above, that is, the corresponding relationship between the arrangement order of the plurality of sub-data signals in the data signals of different sub-pixel groups in the current frame and sub-frames from the first sub-frame to the last sub-frame is different.

The display device and the driving method thereof provided by embodiments of the present application have been described in detail above. Specific examples are used herein to illustrate the principles and implementations of the present application, and the descriptions of the above embodiments are only used to help understand the technical solutions and core ideas of the present application; those of ordinary skill in the art should understand that: they can still modify the technical solutions recorded in the foregoing embodiments, or equivalently replace some of the technical features; and these modifications or replacements do not make the essence of the corresponding technical solutions deviate from the scope of the technical solutions of embodiments of the present application.

What is claimed is:

1. A display device, comprising:

a plurality of sub-pixels, divided into a plurality of sub-pixel groups, wherein each of the sub-pixel groups comprises at least one row of the sub-pixels, and the plurality of sub-pixel groups comprises sub-pixel groups from a first sub-pixel group to an $n^{th}$ sub-pixel group, wherein n is a positive integer greater than 1;

a plurality of gate lines, divided into gate line groups from a first gate line group to an $n^{th}$ gate line group corresponding to the sub-pixel groups from the first sub-pixel group to the $n^{th}$ sub-pixel group, wherein each of the gate lines in an $i^{th}$ gate line group is electrically connected to corresponding ones of the sub-pixels in the $i^{th}$ sub-pixel group, wherein i is a positive integer greater than or equal to 1 and less than or equal to n;

a frame buffer, configured to sequentially buffer data signals of each of the sub-pixels from the first sub-pixel group to the $n^{th}$ sub-pixel group within one frame, wherein one frame comprises sub-frames from a first sub-frame to an $m^{th}$ sub-frame, m is a positive integer greater than 1, and the data signals comprises m sub-data signals of the corresponding sub-pixels respectively presented in sub-frames from the first sub-frame to the $m^{th}$ sub-frame; and a source driver, electrically connected between the frame buffer and the plurality of sub-pixels, configured to:

control each of the sub-pixels in the first sub-pixel group to display an image of the first sub-frame within a current frame, and control each of the sub-pixels in a second sub-pixel group to display an image of a previous frame, when n is equal to 2 and the frame buffer has completed buffering the data signals of each of the sub-pixels in the first sub-pixel group within the current frame; or control each of the sub-pixels in the first sub-pixel group to display the image of the first sub-frame within the current frame, and control each of the sub-pixels in the second sub-pixel group and a third sub-pixel group to display the image of the previous frame, when n is equal to 3 and the frame buffer has completed buffering the data signals of each of the sub-pixels in the first sub-pixel group within the current frame; and, control each of the sub-pixels in the first sub-pixel group and the second sub-pixel group to display an image of a second sub-frame within the current frame, and control each of the sub-pixels in the third sub-pixel group to display the image of the previous frame, when n is equal to 3 and the frame buffer has completed buffering the data signals of each of the sub-pixels in the second sub-pixel group within the current frame; or control each of the sub-pixels in the first sub-pixel group to display the image of the first sub-frame within the current frame, and control each of the sub-pixels in the sub-pixel groups from the second sub-pixel group to the $n^{th}$ sub-pixel group to display the image of the previous frame, when n is greater than 3 and the frame buffer has completed buffering the data signals of each of the sub-pixels in the first sub-pixel group within the current frame; and, control each of the sub-pixels in the sub-pixel groups from the first sub-pixel group to a $j^{th}$ sub-pixel group to display an image of a $j^{th}$ sub-frame within the current frame, and control each of the sub-pixels in the sub-pixel groups from a $(j+1)^{th}$ sub-pixel group to the $n^{th}$ sub-pixel group to display the image of the previous frame, when n is greater than 3 and the frame buffer has completed buffering the data signals of each of the sub-pixels in the $j^{th}$ sub-pixel group within the current frame, wherein j is greater than 1 and less than n; and, control each of the sub-pixels in the sub-pixel groups from the first sub-pixel group to the $n^{th}$ sub-pixel group to display an image of an $n^{th}$ sub-frame within the current frame, when n is greater than 3 and the frame buffer has completed buffering the data signals of each of the sub-pixels in the $n^{th}$ sub-pixel group within the current frame, wherein j is a positive integer greater than 1 and less than n.

2. The display device according to claim 1, wherein n is less than or equal to m.

3. The display device according to claim 1, wherein each of the sub-data signals has a corresponding weight coefficient, wherein a value of each of the sub-data signals is used for controlling the corresponding sub-pixel to emit light or extinguish, the weight coefficient corresponding to each of the sub-data signals is used for controlling a duration of light-emitting or of extinguishing of the corresponding sub-pixel, and weight coefficients of at least some of the sub-data signals among the m sub-data signals are different;

the m sub-data signals arranged in sequence in the data signals of each of the sub-pixels in the first sub-pixel group correspond respectively to the sub-frames from the first sub-frame to the $m^{th}$ sub-frame; and when m is greater than 2, the m sub-data signals arranged in sequence within the frame buffer in the data signals of each of the sub-pixels in the second sub-pixel group correspond to the sub-frames from the second sub-frame to the $m^{th}$ sub-frame, and the first sub-frame in sequence.

4. The display device according to claim 3, wherein when n is greater than or equal to 3, m is greater than h, and h is a positive integer greater than 2 and less than n, the m sub-data signals arranged in sequence within the frame buffer in the data signals of each of the sub-pixels in an $h^{th}$ sub-pixel group correspond to the sub-frames from an $h^{th}$ sub-frame to the $m^{th}$ sub-frame, and the sub-frames from the first sub-frame to a $(h-1)^{th}$ sub-frame in sequence.

5. The display device according to claim 4, wherein the source driver is configured to:

control each of the sub-pixels in the sub-pixel groups from the first sub-pixel group to the $j^{th}$ sub-pixel group to display the image of the $j^{th}$ sub-frame within the current frame according to the sub-data signal of the $j^{th}$ sub-frame of the current frame, and control each of the sub-pixels in a kth sub-pixel group in the sub-pixel groups from the $(j+1)^{th}$ sub-pixel group to the $n^{th}$ sub-pixel group to display an image of a $(m+j-k+1)^{th}$ sub-frame within the previous frame according to a $(m+j-k+1)^{th}$ sub-data signal of the previous frame, when the frame buffer has completed buffering the data signals of each of the sub-pixels in the $j^{th}$ sub-pixel group within the current frame, wherein k is a positive integer greater than or equal to j+1, and less than or equal to n.

6. The display device according to claim 3, wherein some of the sub-data signals with sequentially increasing weight coefficients corresponding to each of the sub-pixels in the first sub-pixel group are continuously arranged in the corresponding m sub-data signals arranged in sequence.

7. The display device according to claim 4, wherein some of the sub-data signals with sequentially increasing weight coefficients corresponding to each of the sub-pixels in the first sub-pixel group are continuously arranged in the corresponding m sub-data signals arranged in sequence.

8. The display device according to claim 5, wherein some of the sub-data signals with sequentially increasing weight coefficients corresponding to each of the sub-pixels in the first sub-pixel group are continuously arranged in the corresponding m sub-data signals arranged in sequence.

9. The display device according to claim 3, wherein some of the sub-data signals with sequentially increasing weight coefficients corresponding to each of the sub-pixels in the first sub-pixel group are dispersedly arranged in the corresponding m sub-data signals arranged in sequence.

10. The display device according to claim 4, wherein some of the sub-data signals with sequentially increasing weight coefficients corresponding to each of the sub-pixels in the first sub-pixel group are dispersedly arranged in the corresponding m sub-data signals arranged in sequence.

11. The display device according to claim 5, wherein some of the sub-data signals with sequentially increasing weight coefficients corresponding to each of the sub-pixels in the first sub-pixel group are dispersedly arranged in the corresponding m sub-data signals arranged in sequence.

12. The display device according to claim 3, wherein the display device comprises a first refresh rate mode and a second refresh rate mode, and a refresh rate of the display device in the first refresh rate mode is greater than a refresh rate of the display device in the second refresh rate mode; wherein when the display device is in the first refresh rate mode, some of the sub-data signals with sequentially increasing weight coefficients corresponding to each of the sub-pixels in the first sub-pixel group are continuously arranged in the corresponding m sub-data signals arranged in sequence; and when the display device is in the second refresh rate mode, some of the sub-data signals with sequentially increasing weight coefficients corresponding to each of the sub-pixels in the first sub-pixel group are dispersedly arranged in the corresponding m sub-data signals arranged in sequence.

13. The display device according to claim 4, wherein the display device comprises a first refresh rate mode and a second refresh rate mode, and a refresh rate of the display device in the first refresh rate mode is greater than a refresh rate of the display device in the second refresh rate mode; wherein when the display device is in the first refresh rate mode, some of the sub-data signals with sequentially increasing weight coefficients corresponding to each of the sub-pixels in the first sub-pixel group are continuously arranged in the corresponding m sub-data signals arranged in sequence; and when the display device is in the second refresh rate mode, some of the sub-data signals with sequentially increasing weight coefficients corresponding to each of the sub-pixels in the first sub-pixel group are dispersedly arranged in the corresponding m sub-data signals arranged in sequence.

14. The display device according to claim 5, wherein the display device comprises a first refresh rate mode and a second refresh rate mode, and a refresh rate of the display device in the first refresh rate mode is greater than a refresh rate of the display device in the second refresh rate mode; wherein when the display device is in the first refresh rate mode, some of the sub-data signals with sequentially increasing weight coefficients corresponding to each of the sub-pixels in the first sub-pixel group are continuously arranged in the corresponding m sub-data signals arranged in sequence; and when the display device is in the second refresh rate mode, some of the sub-data signals with sequentially increasing weight coefficients corresponding to each of the sub-pixels in the first sub-pixel group are dispersedly arranged in the corresponding m sub-data signals arranged in sequence.

15. The display device according to claim 1, wherein each of gate line groups from the first gate line group to a $(n-1)^{th}$ gate line group includes a same number of gate lines, and a number of gate lines in the $n^{th}$ gate line group is less than or equal to a number of gate lines in each of gate line groups from the first gate line group to the $(n-1)^{th}$ gate line group.

16. The display device according to claim 1, further comprising a gate driver and a plurality of data lines; wherein each of the gate lines is electrically connected between a corresponding output terminal of the gate driver and a corresponding row of sub-pixels, so as to transmit a corresponding gate signal to the corresponding row of sub-pixels, and each of the data lines is electrically connected between the source driver and a corresponding column of sub-pixels to transmit a corresponding data signal to the corresponding column of sub-pixels.

17. The display device according to claim 16, further comprising a timing controller; wherein the timing controller is configured to obtain control signals and a plurality of image signals corresponding to a plurality of frames, and generate clock signals acting on the gate driver according to the control signals;

the gate driver is further configured to generate a plurality of gate signals according to the clock signals;

the frame buffer is further configured to obtain image signals of each of the frames, wherein each of the image signals comprises a plurality of gray scale signals corresponding to a plurality of sub-pixels, and the gray scale signals represent gray scale values of the plurality of sub-pixels; and, the frame buffer is further configured to generate corresponding data signals according to the gray scale signals; and the source driver is further configured to output data signals corresponding to a row of sub-pixels when the row of sub-pixels is turned on, so that each of a plurality of sub-pixels in the row emits light according to corresponding data signals.

18. A driving method of a display device, used for driving the display device according to claim 1, comprising:

controlling the frame buffer to sequentially buffer data signals of each of the sub-pixels from the first sub-pixel group to the $n^{th}$ sub-pixel group within one frame;

judging whether n is equal to 2;

controlling, through the source driver, each of the sub-pixels in the first sub-pixel group to display an image of the first sub-frame within a current frame, and controlling each of the sub-pixels in the second sub-pixel group to display an image of a previous frame, when n is equal to 2 and the frame buffer has completed buffering the data signals of each of the sub-pixels in the first sub-pixel group within the current frame;

judging whether n is equal to 3 when n is not equal to 2;

controlling, through the source driver, each of the sub-pixels in the first sub-pixel group to display the image of the first sub-frame within the current frame, and controlling each of the sub-pixels in the second sub-pixel group and the third sub-pixel group to display the image of the previous frame, when n is equal to 3 and the frame buffer has completed buffering the data signals of each of the sub-pixels in the first sub-pixel group within the current frame; and, controlling, through the source driver, each of the sub-pixels in the first sub-pixel group and the second sub-pixel group to display an image of the second sub-frame within the current frame, and controlling each of the sub-pixels in the third sub-pixel group to display the image of the previous frame, when n is equal to 3 and the frame buffer has completed buffering the data signals of each of the sub-pixels in the second sub-pixel group within the current frame;

judging whether n is greater than 3 when n is not equal to 3; and controlling, through the source driver, each of the sub-pixels in the first sub-pixel group to display the image of the first sub-frame within the current frame, and controlling each of the sub-pixels in the sub-pixel groups from the second sub-pixel group to the $n^{th}$ sub-pixel group to display the image of the previous frame, when n is greater than 3 and the frame buffer has completed buffering the data signals of each of the sub-pixels in the first sub-pixel group within the current frame; and, controlling, through the source driver, each of the sub-pixels in the sub-pixel groups from the first sub-pixel group to the $j^{th}$ sub-pixel group to display an image of the $j^{th}$ sub-frame within the current frame, and controlling each of the sub-pixels in the sub-pixel groups from the $(j+1)^{th}$ sub-pixel group to the $n^{th}$ sub-pixel group to display the image of the previous frame, when n is greater than 3 and the frame buffer has completed buffering the data signals of each of the sub-pixels in the $j^{th}$ sub-pixel group within the current frame, wherein j is greater than 1 and less than n; and, controlling, through the source driver, each of the sub-pixels in the sub-pixel groups from the first sub-pixel group to the $n^{th}$ sub-pixel group to display an image of the $n^{th}$ sub-frame within the current frame, when n is greater than 3 and the frame buffer has completed buffering the data signals of each of the sub-pixels in the $n^{th}$ sub-pixel group within the current frame, wherein j is a positive integer greater than 1 and less than n.

19. The driving method of the display device according to claim 18, wherein weight coefficients of at least some of the sub-data signals among m sub-data signals are different, and the weight coefficient corresponding to each of the sub-data signals is used for controlling a duration of light-emitting or extinguishing of the corresponding sub-pixel; wherein the step of controlling the frame buffer to sequentially buffer data signals of each of the sub-pixels from the first sub-pixel group to the $n^{th}$ sub-pixel group within one frame, comprises:

controlling the frame buffer to sequentially buffer the m sub-data signals corresponding respectively to the sub-frames from the first sub-frame to the $m^{th}$ sub-frame in the data signals of each of the sub-pixels in the first sub-pixel group; and controlling the frame buffer to sequentially buffer the m sub-data signals corresponding respectively to the sub-frames from the second sub-frame to the $m^{th}$ sub-frame, and the first sub-frame in the data signals of each of the sub-pixels in the second sub-pixel group when m is greater than 2.

20. The driving method of the display device according to claim 19, wherein the step of controlling the frame buffer to sequentially buffer data signals of each of the sub-pixels from the first sub-pixel group to the $n^{th}$ sub-pixel group within one frame, further comprises:

controlling the frame buffer to sequentially buffer the m sub-data signals corresponding respectively to the sub-frames from the $h^{th}$ sub-frame to the $m^{th}$ sub-frame and the sub-frames from the first sub-frame to the $(h-1)^{th}$ sub-frame in the data signals of each of the sub-pixels in the $h^{th}$ sub-pixel group, when n is greater than or equal to 3 and m is greater than h, wherein h is a positive integer greater than 2 and less than n.

* * * * *